US009787752B2

(12) United States Patent
Zhu et al.

(10) Patent No.: US 9,787,752 B2
(45) Date of Patent: Oct. 10, 2017

(54) HOTSPOT EDITOR FOR A USER INTERFACE

(71) Applicant: SAP SE, Walldorf (DE)

(72) Inventors: Jinyou Zhu, Singapore (SG); Xiang Cai, Singapore (SG)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 14/476,687

(22) Filed: Sep. 3, 2014

(65) Prior Publication Data

US 2016/0062961 A1 Mar. 3, 2016

(51) Int. Cl.
*G06F 17/00* (2006.01)
*H04L 29/08* (2006.01)
*G06F 17/24* (2006.01)
*G06F 9/44* (2006.01)
*G06F 3/0481* (2013.01)
*G06F 3/0484* (2013.01)
*G06F 9/455* (2006.01)

(52) U.S. Cl.
CPC ............ *H04L 67/02* (2013.01); *G06F 3/0481* (2013.01); *G06F 3/0484* (2013.01); *G06F 3/04842* (2013.01); *G06F 8/38* (2013.01); *G06F 9/4443* (2013.01); *G06F 17/24* (2013.01); *G06F 9/45529* (2013.01)

(58) Field of Classification Search
CPC .................................................. G06F 3/04842
See application file for complete search history.

(56) References Cited

U.S. PATENT DOCUMENTS

| 6,075,537 | A | * | 6/2000 | Adapathya | ........... G06F 3/04842 707/E17.013 |
| 6,253,229 | B1 | * | 6/2001 | Nielsen | ............. G06F 17/30905 707/E17.121 |
| 6,515,685 | B1 | * | 2/2003 | Halverson | ............. G06F 3/0481 345/163 |
| 8,042,064 | B2 | * | 10/2011 | Cardu | ................. G06F 3/04845 715/719 |
| 9,037,958 | B2 | * | 5/2015 | Allen | ..................... G06F 3/0481 715/207 |
| 2002/0126990 | A1 | * | 9/2002 | Rasmussen | ........ H04N 7/17318 386/240 |

(Continued)

OTHER PUBLICATIONS

Garden Gnome Software, "Hotspot Editor (Object2VR)," captured on Nov. 17, 2013, Internet Archive Wayback Machine, p. 1-5, available at https://web.archive.org/web/20131117013108/http://ggnome.com/wiki/Hotspot_Editor_(Object2VR).*

(Continued)

*Primary Examiner* — Amelia Tapp
(74) *Attorney, Agent, or Firm* — Jones Day

(57) ABSTRACT

Described herein is a technology for modifying hotspot objects in a user interface (UI). In one implementation, a view of a user interface is presented on a display by a hotspot manager. UI interaction including selection of a location in the view is received. A hotspot object associated to the selected location of the view may be modified based on the UI interaction when the hotspot manager is in an edit mode. The hotspot object contains information of the selected location. An updated content of the hotspot object may be presented in the edit mode, the updated content resulting from changes to an existing hotspot object or addition of a new hotspot object.

20 Claims, 13 Drawing Sheets

(56) References Cited

U.S. PATENT DOCUMENTS

| | | | |
|---|---|---|---|
| 2005/0188353 A1* | 8/2005 | Hasson | G06F 8/70 717/116 |
| 2008/0084573 A1* | 4/2008 | Horowitz | G06F 17/2229 358/1.13 |
| 2011/0016376 A1* | 1/2011 | Hinson | G06F 17/30899 715/205 |
| 2011/0219296 A1* | 9/2011 | Michaud | G06F 17/30905 715/234 |
| 2013/0174037 A1* | 7/2013 | Gao | H04N 7/14 715/719 |
| 2014/0075287 A1* | 3/2014 | Scoda | G06F 17/30038 715/234 |
| 2015/0186340 A1* | 7/2015 | Liu | G06F 17/30905 715/206 |

OTHER PUBLICATIONS

Garden Gnome Software, "Add Hotspots (Object2VR)," captured Nov. 2013, Internet Archive Wayback Machine, p. 1-7, available at https://web.archive.org/web/20131118013623/http://ggnome.com/wiki/Add_Hotspots_(Object2VR).*

Garden Gnome Software, "Hotspot Editor (Pano2VR)," captured Nov. 2013, Internet Archive Wayback Machine, p. 1-7, available at https://web.archive.org/web/20131116085442/http://ggnome.com/wiki/Hotspot_Editor_(Pano2VR).*

Der Stepanian, Publitas, "Product Update: Improved Hotspot Editor," Feb. 26, 2014, p. 1-7, available at https://www.publitas.com/blog/product-update-improved-hotspot-editor.*

Hillar, Moodle 2.5 Multimedia Cookbook, published Oct. 25, 2013, Packt Publishing, "Adding hotspots to photos," 9 pages.*

* cited by examiner

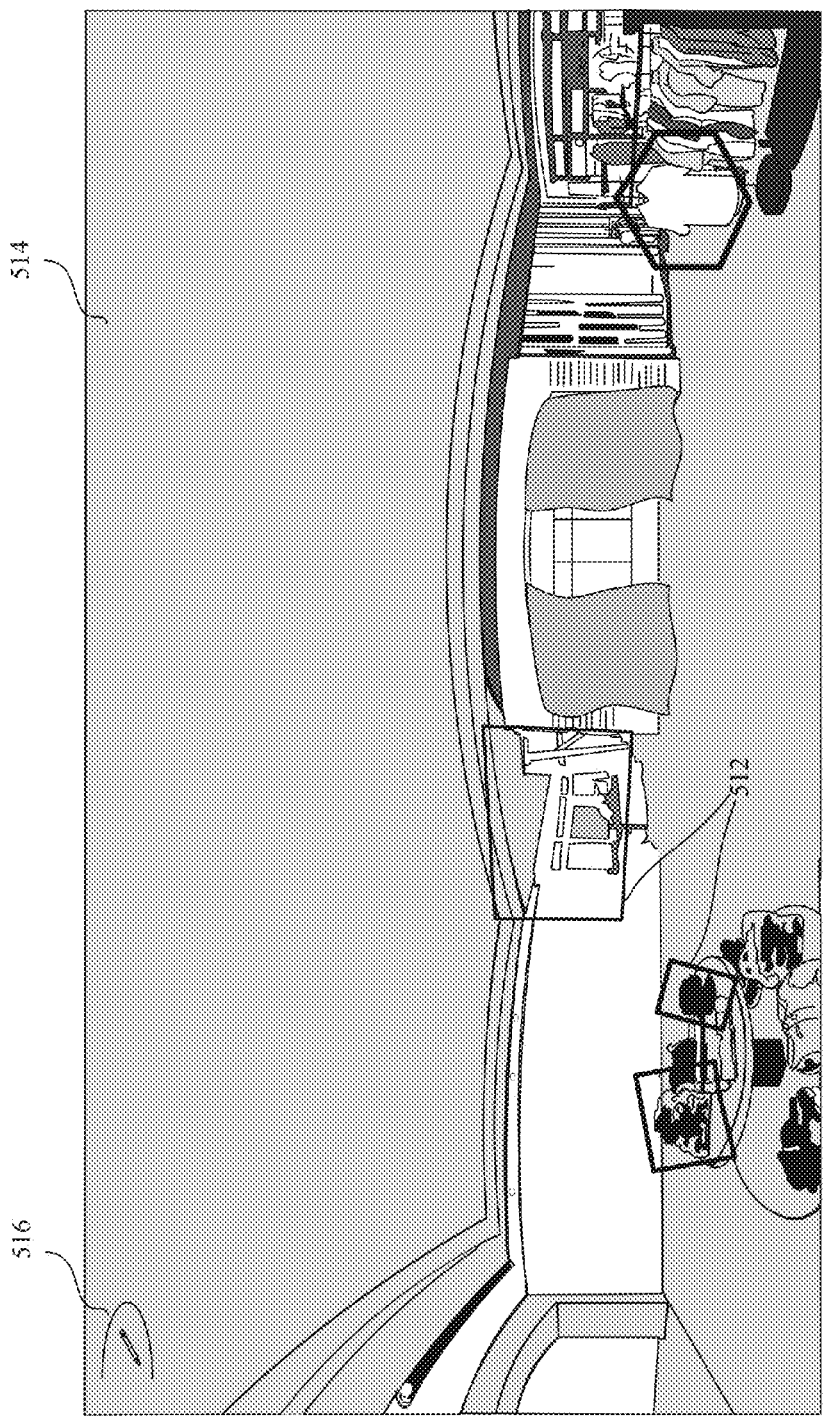

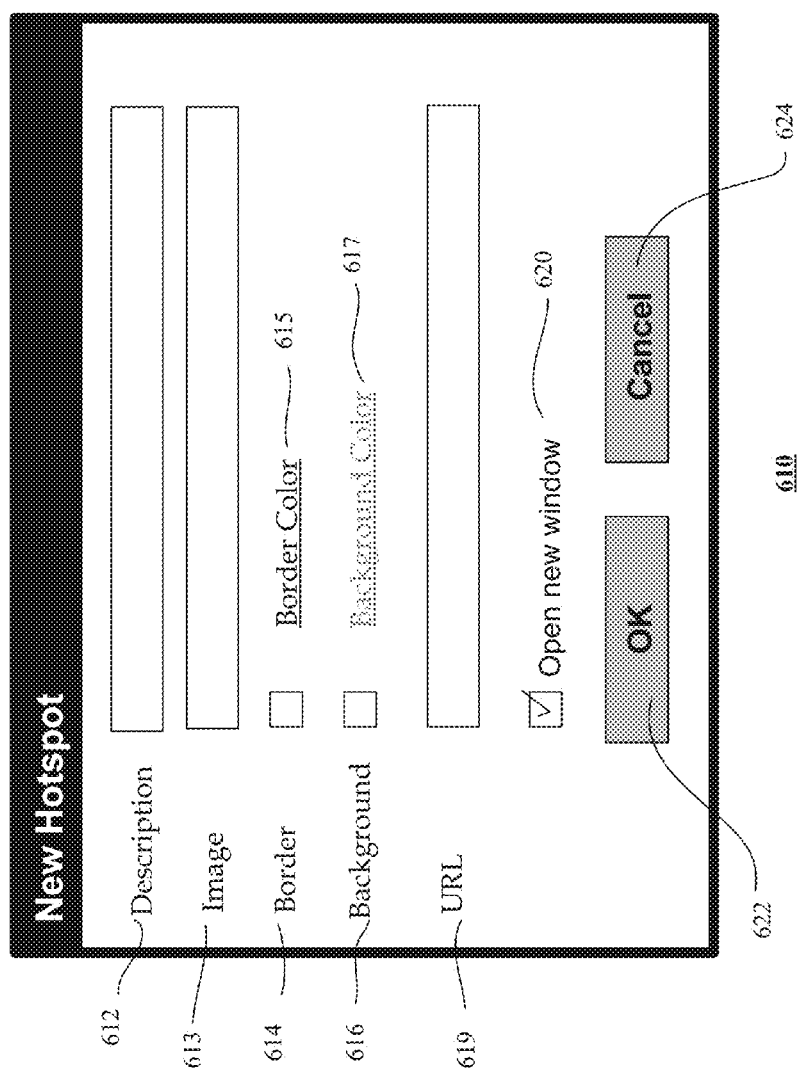

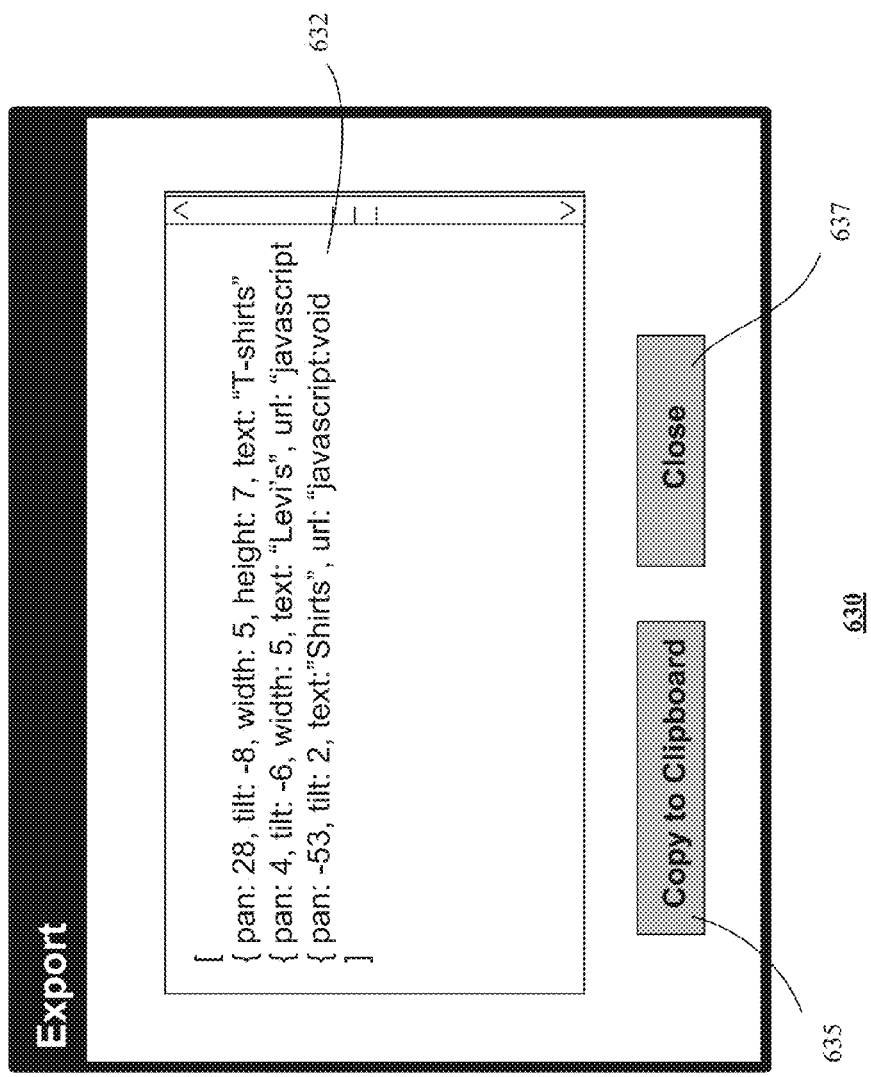

HOTSPOT EDITOR FOR A USER INTERFACE

TECHNICAL FIELD

The present disclosure relates generally to generating and modifying hotspots in a user interface (UI).

BACKGROUND

A "hotspot" in a user interface (UI) generally refers to an area of an image that activates a function when selected. For instance, hotspots may be used to embed regions or portions within an image with various functions. It may be desirable to employ hotspots for various applications. However, creating hotspots requires coding which may be time consuming and cumbersome to developers. In some instances, it may be tedious to define and change the attributes of hotspots in an image.

SUMMARY

A technology for modifying hotspot objects in a user interface (UI) is described herein. In accordance with one aspect of the technology, a view of a user interface is presented on a display by a hotspot manager. UI interaction including selection of a location in the view is received. The selected location may be enlarged. A hotspot object associated to the selected location of the view may further be modified based on the UI interaction when the hotspot manager is in an edit mode. The hotspot object contains information of the selected location. If the selected location includes an existing hotspot object, the modification may include performing changes to the existing hotspot object. If the selected location does not have a hotspot object, the modification may include adding a new hotspot object at the selected location.

In accordance with another aspect, a view of a user interface is presented on a display by a hotspot manager. UI interaction including selection of a location in the view may be received. A hotspot object associated to the selected location of the view may be modified based on the UI interaction when the hotspot manager is in an edit mode. The hotspot object contains information of the selected location. If the selected location includes an existing hotspot object, the modification may include performing changes to the existing hotspot object. If the selected location does not have a hotspot object, the modification may include adding a new hotspot object at the selected location. An updated content of the hotspot object may be presented in the edit mode, the updated content resulting from changes to the existing hotspot object or addition of the new hotspot object.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIGS. 5a-d illustrate exemplary display of GUIs during the design time process;

FIGS. 6a-c illustrate exemplary dialog boxes that may be presented to a user.

DETAILED DESCRIPTION

Figure 1:
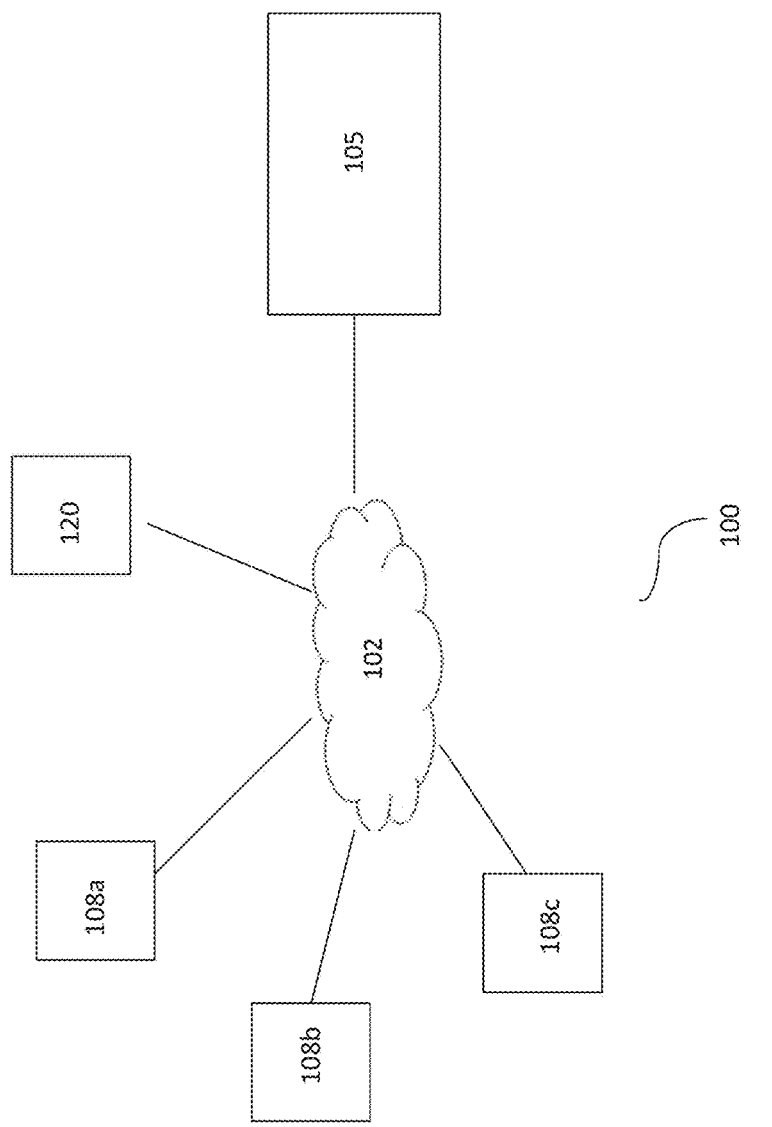
FIG. 1 shows an exemplary environment.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Disclosed herein are technologies for modifying hotspots in a UI. Modifying the hotspots as used herein may include, but not limited to, creating and editing hotspot objects. In accordance with one aspect of the technology, a hotspot manager with what-you-see-is-what-you-get (WYSIWYG) functionalities is employed to create and edit hotspots in a UI. The image hotspot manager may include a hotspot editor. In one implementation, the hotspot editor is a WYSIWYG hotspot editor that enables runtime behaviours of hotspot objects such as content update and user interaction during design time of the hotspot objects. The WYSIWYG hotspot editor enables an edit mode during design time of hotspots objects. A user or developer, using the edit mode during design time, may experience runtime behaviours while modifying hotspot objects. For example, the user may view the hotspot as it will appear in runtime, while performing design time actions such as editing the hotspot object.

In one implementation, the WYSIWYG hotspot editor provides the edit mode by employing a multiple layers UI model to facilitate runtime behaviours of the hotspot objects while modifying the hotspots during design time. For example, during design time, the UI may be presented in multiple layers to enable rendering of design-time indicators corresponding to hotspot objects that may be edited with respect to a background view. Using the multiple layers, the hotspot manager may render the runtime contents of the hotspot objects in the UI as the user performs design-time actions such as repositioning the hotspot objects, changing the properties of the hotspot objects, resizing its graphical icons, etc. Such hotspot editor allows the user to create and modify hotspots in an easy and intuitive manner without the need for extensive programming. Developers or users may easily define, via the WYSIWYG hotspot editor, the attributes or properties of hotspot objects, for example, with respect to an view or UI representation in a web page. In addition, the hotspot manager may automatically generate hotspots information once it is created or modified and such information may be exported to other data sources.

In accordance with another aspect, the framework employs the hotspot editor to create and organize hotspots in a panorama view. In some implementations, a user may load a panorama image using a web page and modify hotspot objects to the panorama image. The image may be presented as a panorama view in a user interface. In one implementation, the panorama view may be used as a virtual entry point. For instance, hotspot objects having associated functions may be created on the panorama view using the edit mode as described. For example, in response to a user selection of a hotspot, the functions associated to the hotspot may be invoked. In some implementations, a window may pop up to provide informational context to that portion of the image associated with the hotspot. In addition, the hotspots may further include hyperlinks such as URLs that directs a user to, for example, other web pages in response to a user selection. Other types of functions of the hotspots may also be useful.

For purposes of illustration, the following description may be provided in the context of modifying hotspots in a panorama view. The panorama view, in one implementation, enables a 360 degree view of a panoramic image in a 2D display. However, it should be appreciated that other types of views may also be used in accordance with the technologies described herein. In addition, the technology described herein may be implemented as a method, a computer-controlled apparatus, a computer process, a computing system, or as an article of manufacture such as a computer-usable medium. These and various other features will be apparent from the following description.

FIG. 1 shows a block diagram of an exemplary environment 100. The environment 100, for example, facilitates generating and modifying hotspots in a UI. The environment 100 may have a client/server architecture. For example, the environment may be a distributed client/server architecture. A client/server architecture may have one or more clients 108a-c and one or more servers 105 communicatively coupled via a communication network 102. The communication network 102, for example, may be a local area network (LAN) which interconnects different devices, such as the clients 108a-c and server or servers 105. Other types or configurations of networks may also be useful. For example, the network may be interconnected to other networks through wide area network (WAN) or internet. The devices may be coupled via the network by wireless and/or wired connections. Clients 108a-c may access the server or servers 105 for storage or retrieval of information. Furthermore, a server may facilitate communication between clients.

A server 105, in one implementation, may be a computer which includes a memory and a processor. The memory of a server may include any non-transitory computer-readable media. The memory may be volatile or non-volatile types of memories, such as magnetic media, optical media, random access memory (RAM), read-only memory (ROM), removable media, or any other suitable local or remote memory component. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or a mobile computing device, such as a laptop, a tablet or a smart phone. Other types of processing devices may also be used. A client can receive, transmit, process and store any appropriate data associated with the environment 100.

Client/server (C/S) applications may be provided in the environment 100. Generally, C/S applications include front end and backend portions. The front end portions are stored locally on the clients while the backend portions are located in the server. Various types of C/S applications may be provided in the environment. The C/S applications, for example, may include UI design applications. Other types of applications, including non-C/S applications, may also be useful.

A client may include a user interface for a user to interact with the environment for various purposes. For example, the interface may be used to access various applications in the environment 100. The user interface may also serve other purposes. In one implementation, the user interface comprises a graphical user interface (GUI). A GUI may provide an efficient and user-friendly manner of presenting information or communicating with the environment 100. The type of user interface may depend on the type of application running on the client. For example, the front end portion may include a GUI which enables a user to interact with the back end portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as an email system. Any user may access the user's respective account from any client by performing an authentication or a login process, such as providing a user name and password.

In one implementation, the environment 100 includes a hotspot manager 120. The hotspot manager 120, in one implementation, is a software tool configured to modify hotspot objects in a UI. For example, a user may employ the hotspot manager 120 to create and manage hotspots on a panorama view of a UI. The hotspot manager 120, in some implementations, may be web-based. The hotspot manager 120, for example, may be hosted by one or more servers 105. For instance, a user may access the hotspot manager 120 using a web page. A user may access the web page using a web browser-based application in client device 108. Alternatively, the hotspot manager 120 may reside on client device 108, such as desktop or mobile computing device. The hotspot manager 120 may be integrated into a UI design application. Providing the hotspot manager 120 as a stand-alone tool, such as a C/S application, desktop or mobile application, may also be useful. Other configurations of the hotspot manager 120 may also be useful.

In some implementations, the hotspot manager 120 includes WYSIWYG functionalities. For example, the hotspot manager 120 enables runtime behaviours of hotspot objects during design time process (e.g., creating hotspot objects, repositioning the hotspot in the UI, resizing the hotspots in the UI, changing the attributes of the hotspot objects). For instance, the graphical icon of the hotspot object and its configured position, border, background colour may be rendered in the UI as the user performs modifications during design time.

Figure 2:
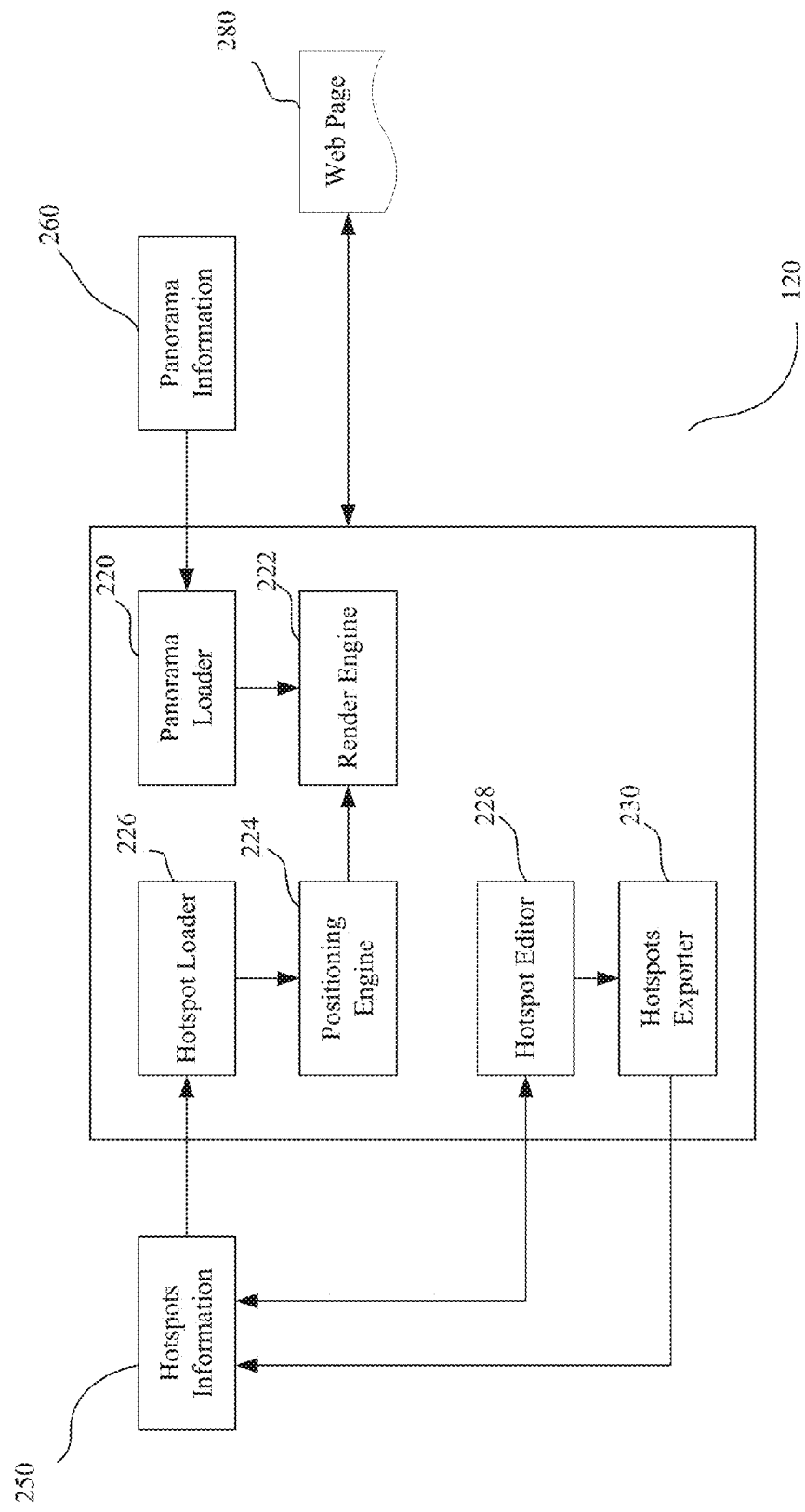
FIG. 2 shows an exemplary architecture of a hotspot manager.

FIG. 2 shows an exemplary architecture 200 of the hotspot manager 120. The hotspot manager 120 includes various modules for displaying runtime content of hotspots while modifying the hotspots in a UI during design time. In one implementation, the hotspot manager 120 includes panorama loader 220, render engine 222, positioning engine 224, hotspot loader 226, hotspot editor 228 and hotspots exporter 230. Providing other modules or configurations of modules for the hotspot manager 120 may also be useful. It should be appreciated that such modules are not necessarily implemented separately, and may be integrated, or divided into further modules. For example, the positioning engine 224 may be integrated with render engine 222.

The hotspot editor 228 enables an edit mode to facilitate creating and modifying hotspots with runtime behaviours during design time. The hotspot editor 228 may be, for instance, a visual editor with a graphical user interface (GUI). In one implementation, the hotspot editor 228 may be a WYSIWYG editor. For example, the hotspot editor may be implemented with WYSIWYG functionalities. In other words, the hotspot editor 228 allows runtime behaviours during design-time process. In such instances, developers or users may view and experience runtime interactions while modifying the hotspot objects during design time.

Figure 3A:
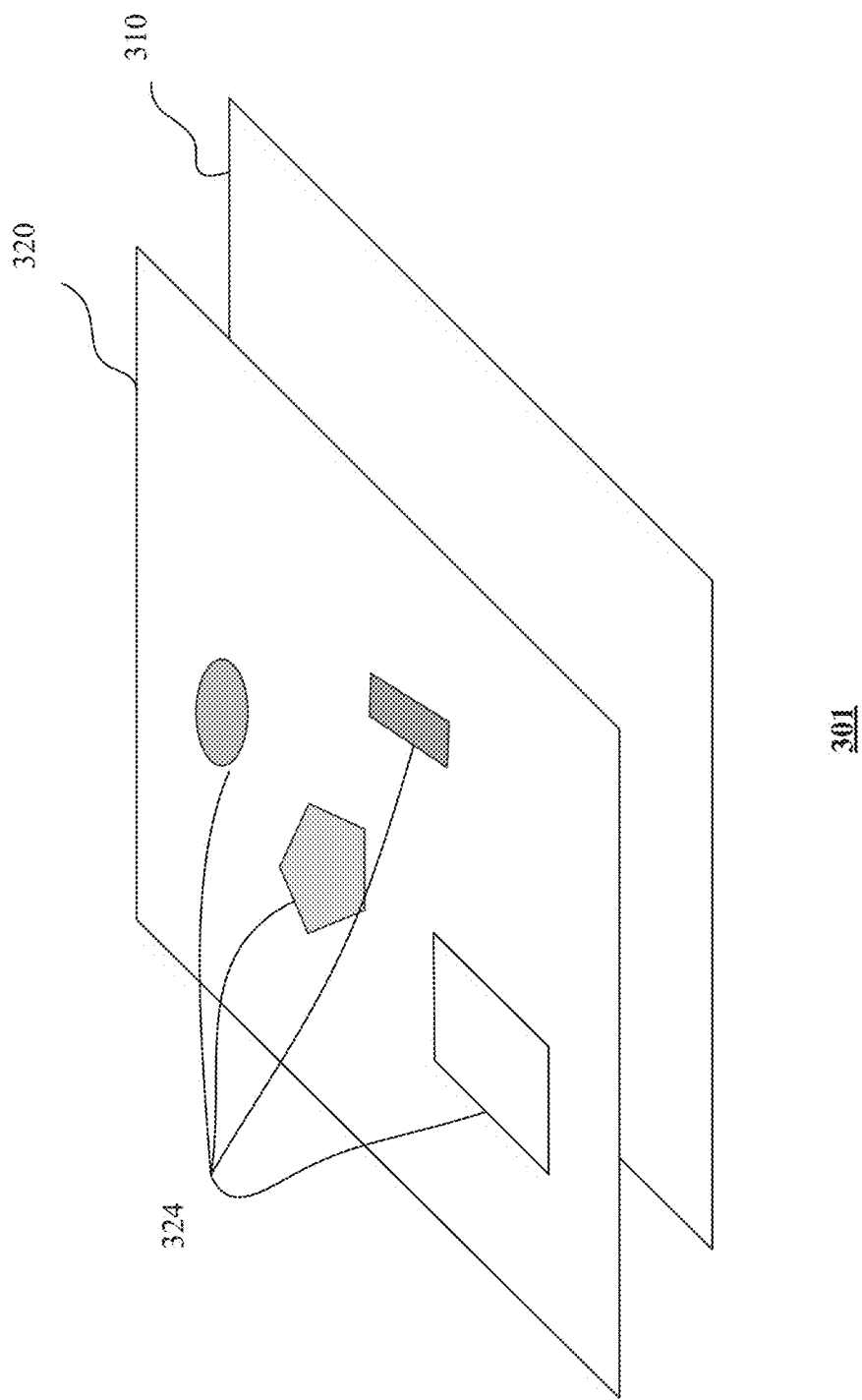
FIGS. 3a-b illustrate exemplary implementations of a graphical user interface (GUI) using a multiple layer UI model, during runtime and design time respectively.
Figure 3B:
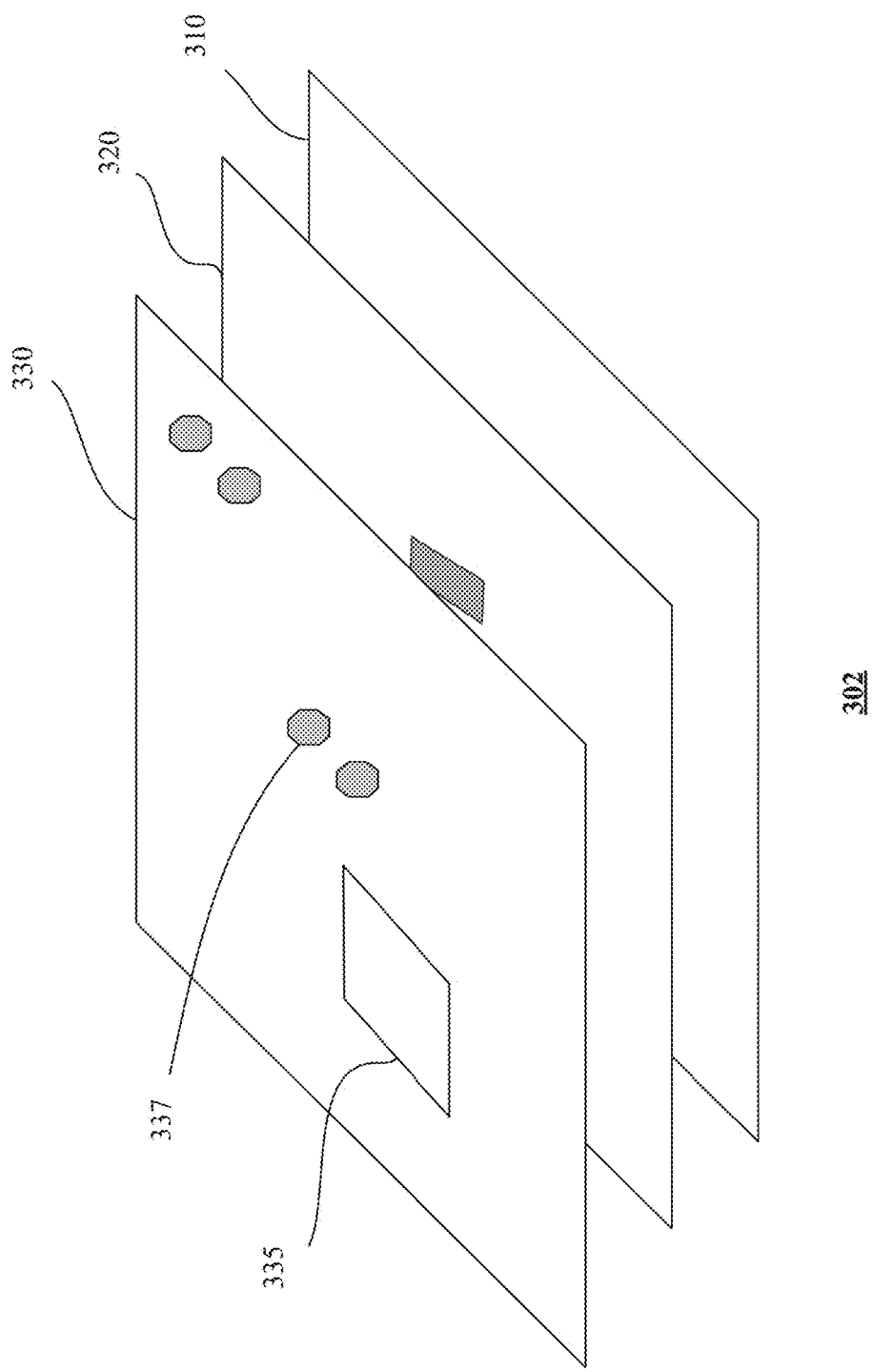

In some implementations, the hotspot editor 228 may be a JavaScript-based editor. Executing the hotspot editor 228 in other types of computing languages may also be useful. In one implementation, the hotspot editor 228 may employ a multiple-layer UI model in accordance with the technologies described herein. FIGS. 3a-b illustrates exemplary implementations of a graphical user interface (GUI) using the multiple layer model, during runtime 301 and design time 302 respectively. For illustration purposes, a three-layer model is described herein. It should be appreciated, however, that the multiple-layer UI model may include more than three layers.

FIG. 3a shows a representation of the GUI, in which during runtime 301, two layers are utilized to render hotspots on a panorama view. A first layer or panorama layer 310 may serve to display the panorama view. The first layer, for example, may be the base layer. A second layer or hotspot layer 320 overlays the panorama layer 310. The hotspot layer 320 may serve to display one or more hotspot objects 324 that overlap the panorama layer. The hotspot objects 324 may include hotspots information that among other things specifies its position in the hotspot layer. The position for example may be its coordinates. In one implementation, the coordinates on the hotspot layer may be relative to the panoramic layer. For instance, in the case of a web implementation, a JavaScript array of the hotspot objects specifies coordinates relative to the panorama layer. Other information may also be included in the hotspots information. For example, a hotspot object may include information such as associated function (URL of an associated link) and appearance. The panorama layer 310 and hotspot layer 320 may overlap and are rendered as a composite GUI view on, for example, a 2D display. A portion of the panorama layer rendered on the 2D display effectively renders one or more hotspots associated to locations in that portion of the panorama layer.

FIG. 3b shows a representation of the GUI during design time 302 in which three layers are utilized. Using three layers, runtime contents of hotspots may be presented in the UI as the hotspots are being created or edited. The three-layer includes panorama layer 310 and hotspot layer 320 as described with reference to FIG. 3a. In one implementation, the panorama layer 310 and hotspot layer 320 may appear and behave in the same manner during runtime and design time. A third layer or design layer 330 which overlays the hotspot layer 320 may be further utilized during design time. As shown, the design layer 330 overlaps the hotspot layer 320, which in turn overlaps the panorama layer 310. These layers may be rendered as a composite GUI, for instance, on a web page.

In one implementation, the design layer 330 enables an edit mode in the GUI during design time. In the edit mode, the design layer 330 allows design-time actions such as creating and modifying the hotspots. As depicted, the design layer 330 may include design-time indicators 335 and 337. For example, the design-time indicators may include among other things, a selection box 335 and buttons 337 in the edit mode to facilitate creation and edits of hotspots in the GUI. The design-time indicators, for instance, may receive and respond to user selections. Such design-time indicators enable editing functions on hotspot objects as the runtime content of the hotspot objects are rendered on the base layer.

Returning to FIG. 2, once a hotspot has been created or edited, the hotspots exporter 230 may automatically acquire and transmit hotspots information 250 to one or more repositories. The hotspots information may include, for example, attributes of the hotspot. The attributes may be, for example, position of the hotspots (e.g., in JavaScript array), border, background colour, embedded image, associated URL link, option to open in new window. A repository, for example, may be any data source such a data storage system or memory module internal or external to the hotspot manager 120. In one implementation, the hotspot information may be stored in a database located in the server 105. In other implementations, the hotspots information may be stored in memory module of a client device 108. Other storage systems may also be useful. For example, the hotspot information may be stored in distributed server.

The hotspot loader 226 may be configured to retrieve the hotspots and the associated hotspots information 250 from the data source. The hotspot loader 226, for example, retrieves or loads hotspots information 250 of existing hotspots. Such information may be sent to the positioning engine 224. As for the positioning engine 226, it may serve to determine position information and/or size of the hotspots, for example, based on the base layer of the UI (e.g., panorama view) that it is associated to. The position information, in one implementation, may be coordinate values that are relative to the panorama view of the UI. For example, the position information may include relative coordinate values.

In an exemplary event, upon receiving user input that zooms in on a location of the panoramic view, the positioning engine 224 may recalculate the relative coordinate values of all hotspot objects. Hotspot objects that are associated to the portion of the panorama view that is enlarged on the 2D display are correspondingly enlarged on the display. Other display changing operations and corresponding calculations may also be useful. For example, in response to receiving a panning action that moves to a particular portion of the panorama view for display, the positioning engine 224 may recalculate the relative coordinate value of all hotspot objects. Accordingly, hotspot objects that are associated to that portion of the panorama view may then be displayed. The hotspots, for example, may be existing hotspots. In other implementations, the hotspots may be hotspots that are being created or edited.

As for the panorama loader 220, it retrieves panorama information 260 of a panoramic image that is to be rendered in a UI. The panoramic image may be rendered as the base layer or background of the UI. The panorama information 260 may include data associated to the panoramic image being loaded including, but not limited to, digital images, size information for rendering as a panorama view. The panorama information 260 may be retrieved from a data source. The source may be a local storage unit in the memory of server 105 or a remote storage system. The remote storage system may be networked server, multiple distributed servers, some data source on the web, or a cloud computing system. For instance, the panorama information may be stored in third party libraries in the web such as JavaScript libraries. Other data sources may also be useful. In other implementations, the panorama information may be stored in memory module of a client device 108. The retrieved data may be sent to the render engine 222.

The render engine 222 may serve to generate a panorama view with one or more associated hotspots in the display. In one implementation, the render engine 222 may acquire the panorama information such as the panorama image and its associated runtime libraries and components from the panorama loader 220. The render engine 222 may further acquire, from the hotspots loader 226 and positioning engine 224, the hotspots information including its position information to be rendered on the panorama view. The render engine 222 may then present the UI of the panorama view with its associated hotspots overlapped on the panorama view. The UI, for example, may be a presented in real-time in web page 280.

Figure 4:
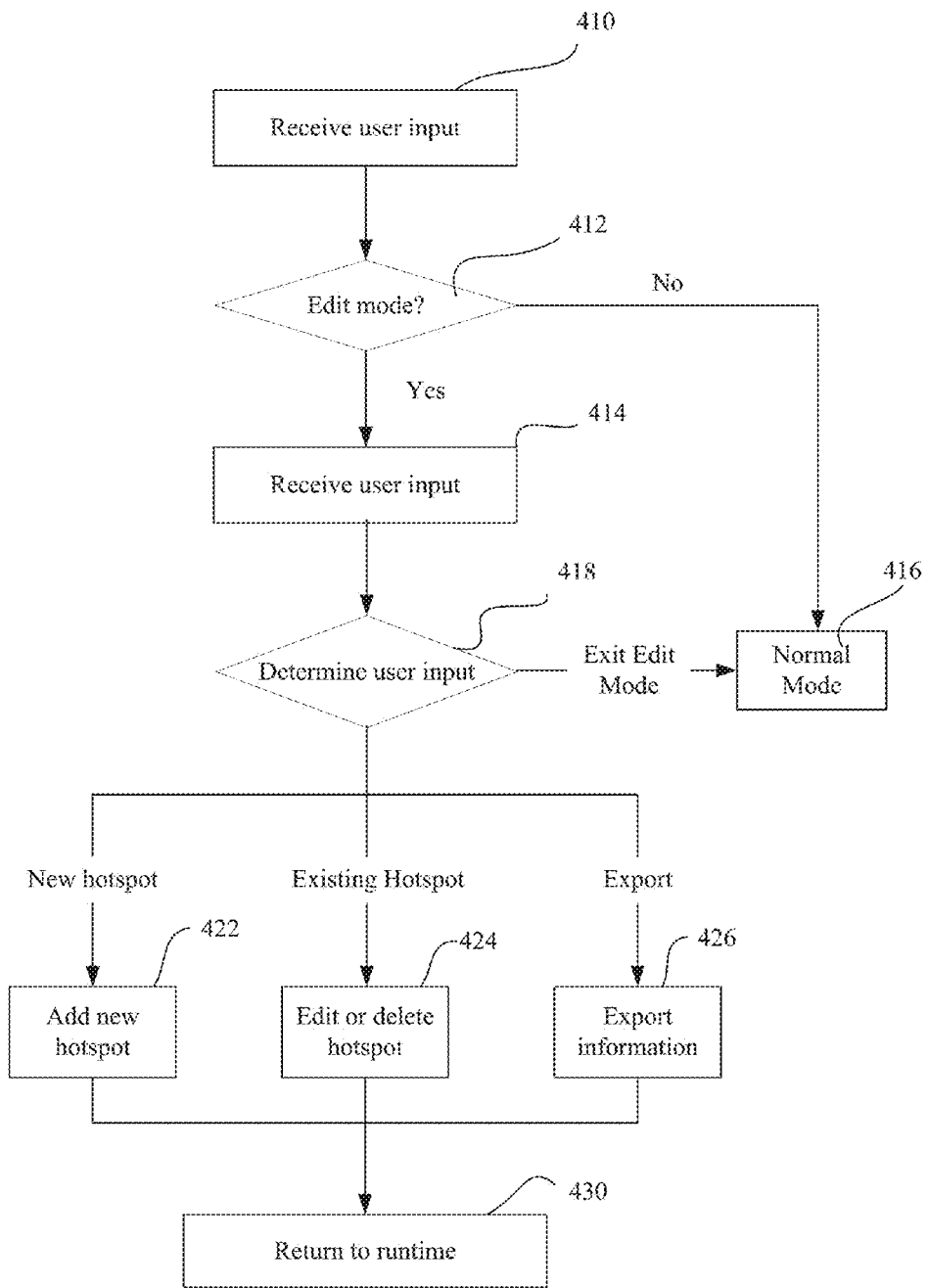
FIG. 4 shows an exemplary design time process for modifying hotspot objects in a UI.

FIG. 4 shows an exemplary design time process 400 for modifying hotspots in a UI. The process 400 may be implemented by the hotspot manager 120, as previously described with reference to FIGS. 1-2. It should be noted that in the following discussion, reference will be made, using like numerals, to the features described in FIGS. 1-2.

At 410, hotspot manager 120 may receive user input. The user input, for example, may include user selection of a UI element. FIG. 5a illustrates an exemplary display of GUI 510 in the normal mode during design time. The GUI 500 may include one or more UI elements of existing hotspot objects 512, for example, on a panoramic view 514. The hotspot objects 512, for example, may be presented as geometrical icons on locations of the panorama view that it is associated with. The geometrical icons may be configured as shapes or outlines such as, for example, polygons, circles, rectangles. As shown, an edit mode 516 element is provided in the GUI.

Returning to FIG. 4, at 412, the hotspot manager 120 determines if an edit element is selected. If an edit element is selected, an edit mode is effected and the hotspot objects that are being displayed with runtime behavior are invoked to be user-selectable. The process proceeds to step 414. Otherwise, the process proceeds to step 416 to continue display of the GUI in the normal mode. At 414, the hotspot editor 228 receives another user input of a UI element. For example, the user input may be an edit selection. In the edit mode, a user, for example, may be provided with edit functions such as add a new hotspot, edit or delete an existing hotspot, export hotspot information or return to normal mode. Other edit functions may also be useful.

Figure 5B:
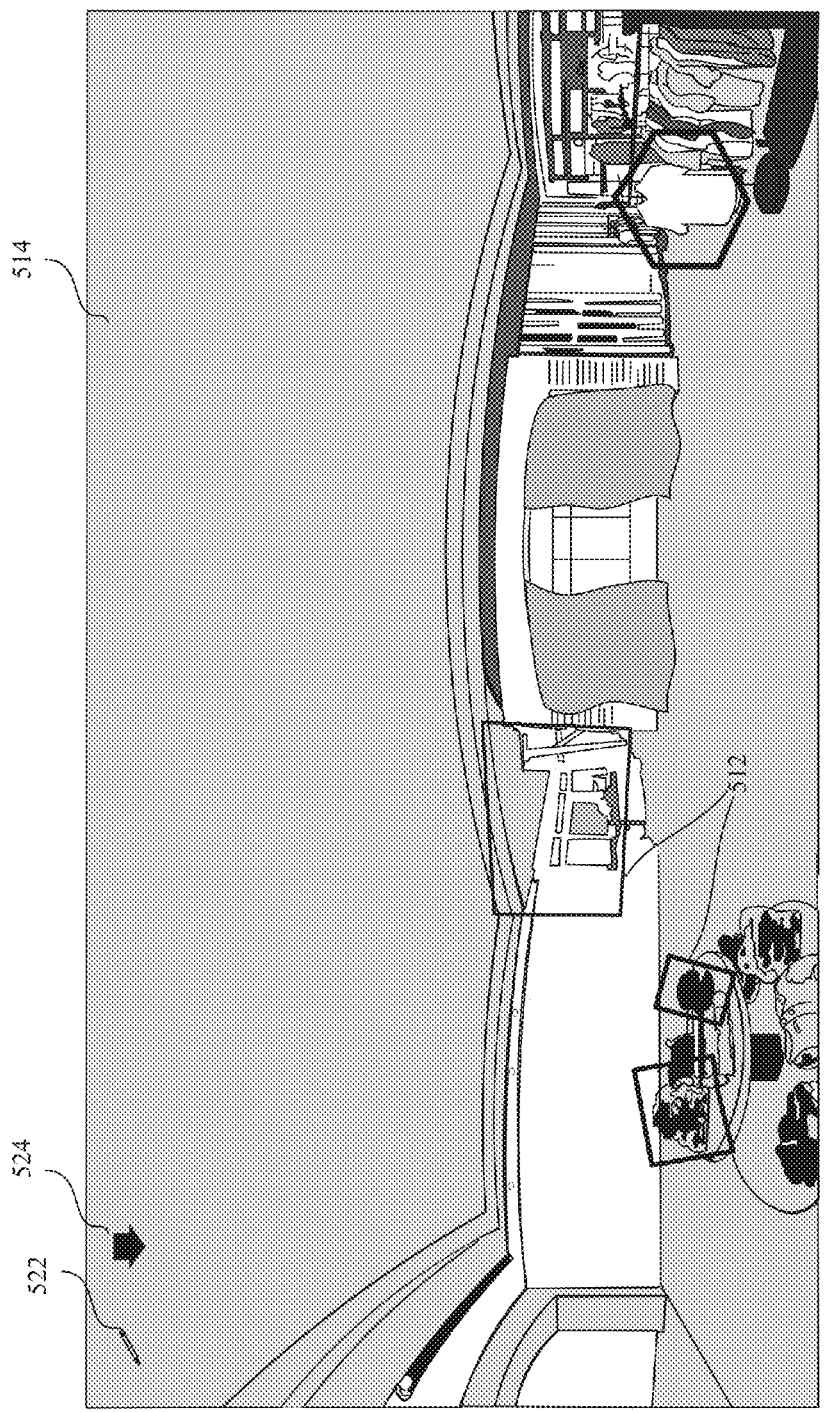

FIG. 5b illustrates an exemplary display of GUI 520 in the edit mode during design time. The GUI 520 may include GUI elements such as, for example, element 522 to return to normal mode, element 524 to export hotspot information, graphical icons of existing hotspots 512. Returning to FIG. 4, at 418, hotspot editor 228 may determine the UI element that has been selected for editing. If a user selects to return to normal mode, the hotspot editor 228 exits the edit mode and returns to display in normal mode at 416.

Figure 5C:
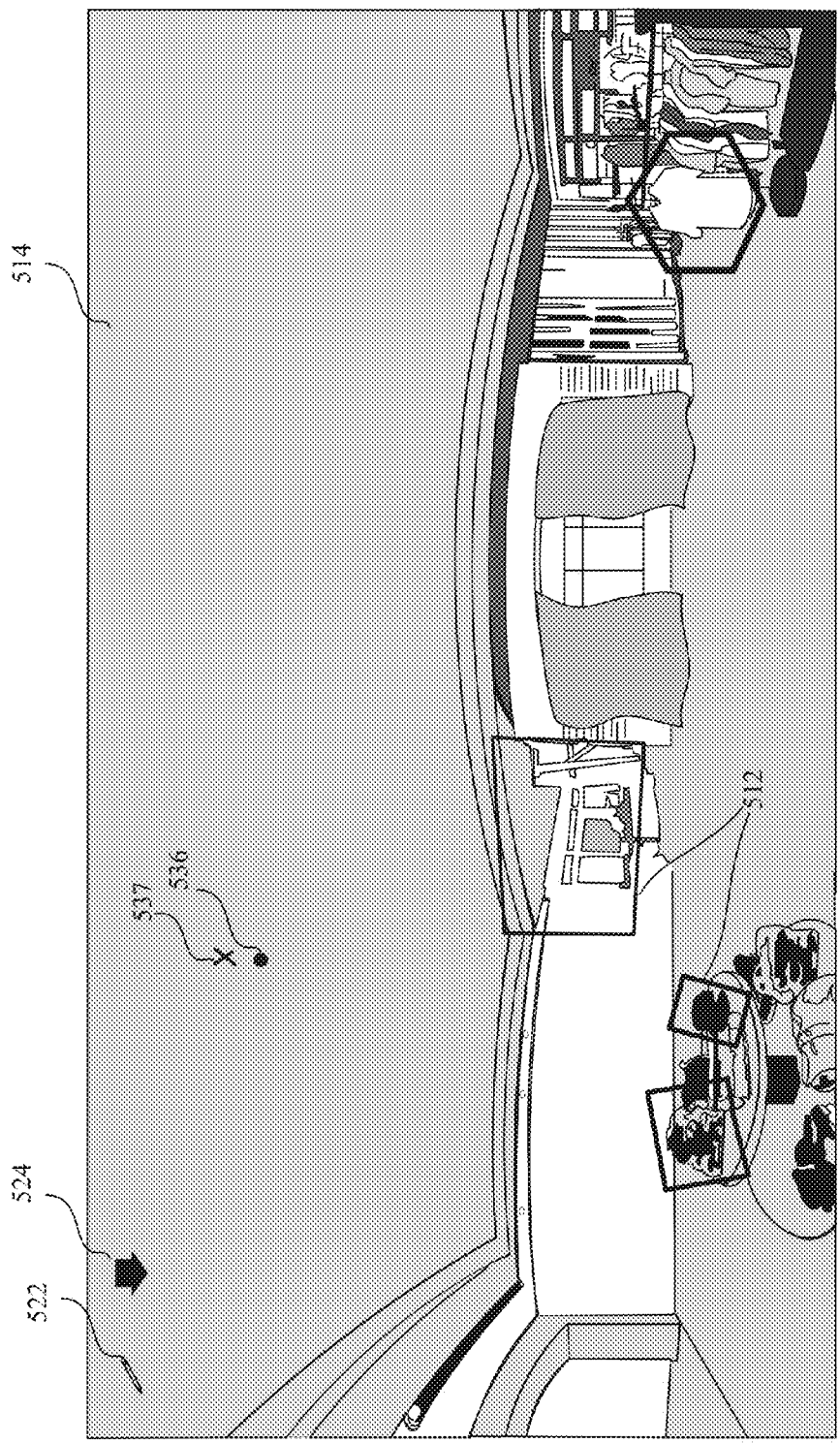

If a user selects the option to create a new hotspot, at 422, the hotspot editor 228 may enable a user to create a hotspot object on the panorama view. A user may select the option to create a hotspot, for example, by double clicking on the UI. Other methods for creating a new hotspot may also be useful such as selecting a button to create the new hotspot. The hotspot editor 228 allows the user to create the hotspot with its runtime content. For example, a graphical icon of the hotspot may be directly created onto the panorama view using, for example, a cursor. In other words, the hotspot element may be created with runtime behavior. As illustrated in FIG. 5c, a graphical icon 536 may appear on the GUI 530 to indicate the selection for creating a new hotspot. In an implementation, the user may directly create the graphical icon of the hotspot object with its runtime shape and size on the desired location of the panorama view. The user, for example, may use a mouse to click and drag the icon 536 in order to expand it into a geometric shape, forming an icon of the new hotspot object. A cancel icon 537 may also be provided to cancel the creation.

Once the user has finished creating the graphical icon of the new hotspot object, the user may input attributes of the hotspot object. The attributes, in one implementation, may include properties and/or functions of the hotspots such as pop-up text description, associated image, border of the hotspot graphical icon and border color, background of the hotspot graphical icon and background color, associated URL link. The hotspot editor 228 may receive the input by way of, for example, another selection on the GUI. In one implementation, the selection may invoke a pop up dialog box. For example, the user may double click on any other area on the GUI to open the dialog box. In one implementation, the dialog box may be used to automatically generate the code for the hotspot that is being created. For instance, as a user confirms the information presented on the dialog box, the corresponding Javascript code of the hotspot attributes is created.

FIG. 6a illustrates an exemplary dialog box that may be presented to the user for completing the process of creating the new hotspot. The dialog box 610 may include fields for user input. For example, the dialog box 610 may include fields to prompt the user for input of attributes to be associated with the hotspot. For example, the dialog box 610 may enable input of attributes such as description embedded with the hotspot 612, associated image 613, selection for border of the graphical icon of the hotspot 614 and border color 615, selection for background of the graphical icon of the hotspot 616 and background color 615, associated URL link 619, option to open a new window 620. The dialog box 610 may also include buttons 622 and 624 for the user to confirm or cancel the action of creating the new hotspot.

Once a user confirms creation of the new hotspot, the hotspot information may be stored. For example, the hotspot editor 228 may save the hotspot information in an internal or external memory. The hotspot information may include, among other things, coordinate values to indicate its relative position to the panorama view that it is associated with. After the dialog box is closed, the process 400 may then proceed to runtime at step 430. This allows the user to view and effect the function of the new hotspot.

Figure 5D:
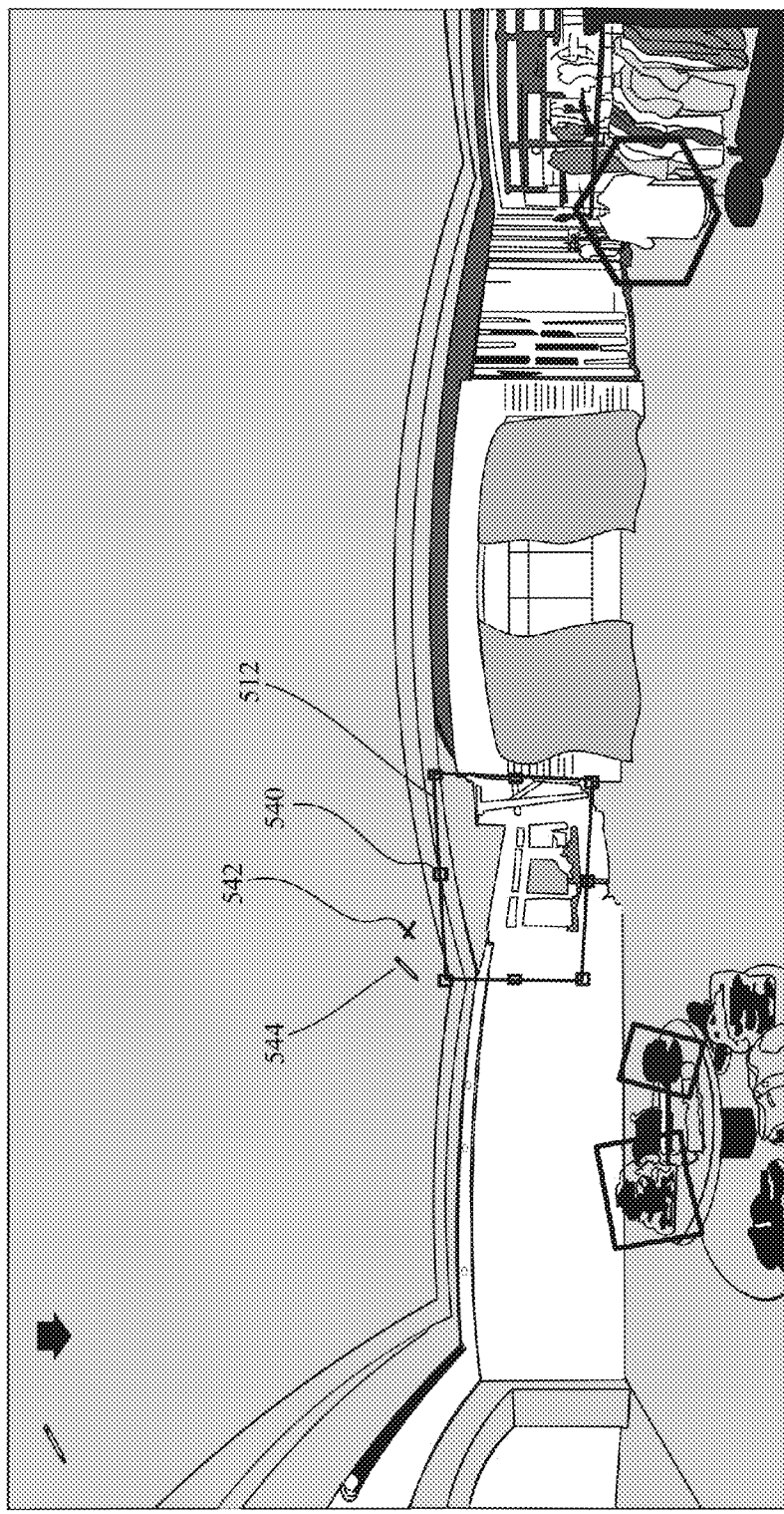

If a user selects the option to edit an existing hotspot, at 424, the hotspot editor 228 may present the user with functional icons or buttons to edit the hotspot. A user may select the option to edit an existing hotspot element, for example, by clicking on an existing hotspot graphical icon. The hotspot editor 228 may further present editing icons or buttons and graphical indicators to the user to facilitate modification of attributes of the hotspot object (e.g., shape, size, position relative to panorama view) or deletion of the hotspot. As illustrated in FIG. 5*d*, the hotspot icon 512 may show graphical indicators such as boxes 540 along the border of the selected hotspot icon 512 to indicate the user selection of that hotspot element. In an implementation, the user may drag the border of the icon in order to resize it. In another implementation, the user may drag and drop the icon to move it to a new position. The user, for example, may also be presented with edit icon 544 to allow changes to other attributes or properties of the selected hotspot object (e.g., colour, configuration of function) via an edit hotspot dialog box or delete icon 542 to delete the hotspot object. Other types of selections and icons may also be useful.

Figure 6B:
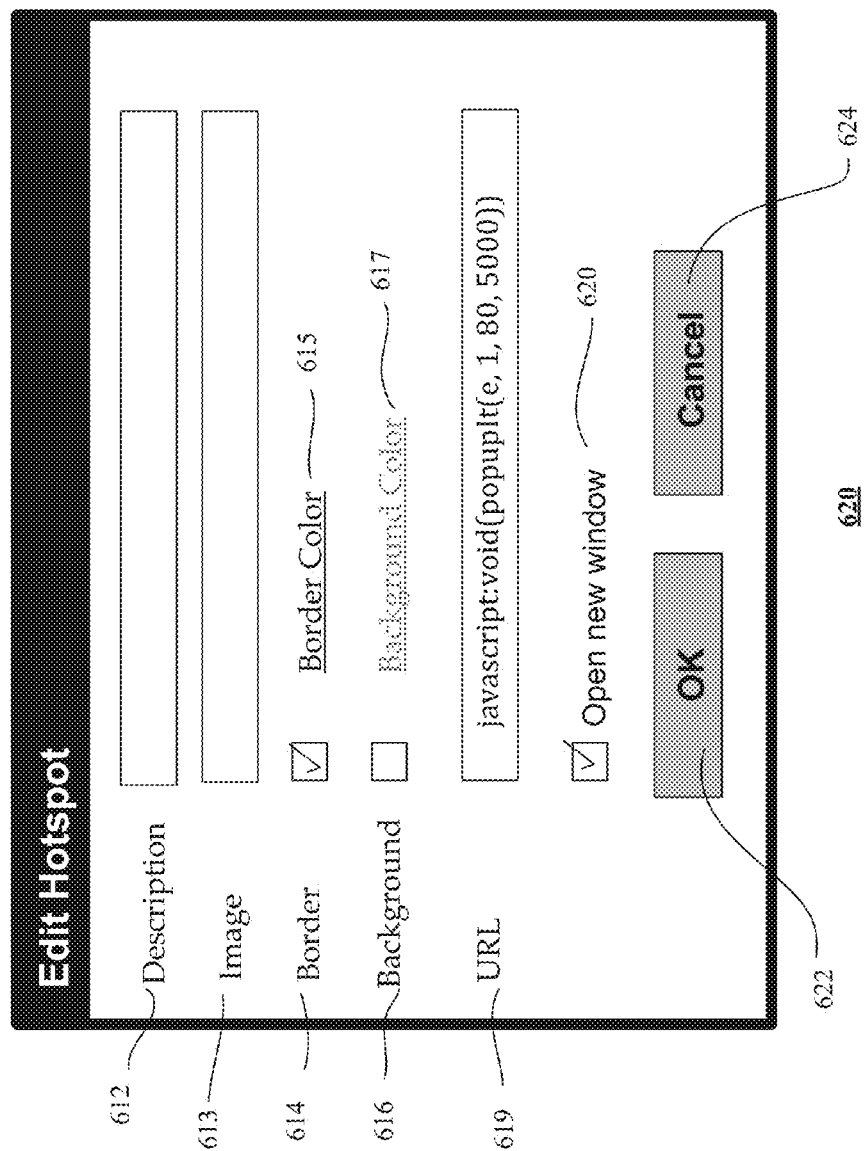

In one implementation, the user may select the edit icon 544 by clicking on it. Upon receiving the user selection of edit icon 544, an edit hotspot dialog box may be presented to the user. FIG. 6*b* illustrates an exemplary dialog box 620 that may be presented to the user for editing the attributes of the hotspot object. The dialog box 620 may include fields to prompt the user for input of the changes to be made to the attributes of the hotspot. For example, the dialog box 620 may enable changes to attributes such as description associated to the hotspot 612, associated image 613, selection for border of the graphical icon of the hotspot 614 and border color 615, selection for background of the graphical icon of the hotspot 616 and background color 615, associated URL link 619, option to open a new window 620. For instance, a user may change, add or delete links using the field 619. The dialog box 620 may also include buttons 622 and 624 for the user to confirm or cancel the action of editing the hotspot.

Once a user confirms modification to the existing hotspot object, the modified hotspot information may be stored. For example, the hotspot editor 228 may save the information in an internal or external memory. In one implementation, the dialog box may be used to automatically generate the code for the hotspot object that has been modified. For instance, as a user confirms the information that is modified on the dialog box or graphical icon of that hotspot object, the corresponding JavaScript code of the hotspot attributes is created. In one implementation, the edited information may overwrite the original information in the memory. After the dialog box is closed, the process 400 may then proceed to runtime at step 430. This allows the user to view and/or effect the function of the modified hotspot.

If a user selects the option to export hotspot information, at 426, the hotspot exporter 230 may export the hotspots information. A user may select the option to export hotspot information, for example, by clicking on tool button such as an export icon. In response to the user selection, the hotspot exporter 230 may present an export dialog. FIG. 6*c* illustrates an exemplary dialog box 630 that may be presented to the user for exporting the hotspot information. In one implementation, the hotspot exporter 230 may automatically retrieve the export data in the form of JavaScript code 632. The retrieved export data may be a JavaScript array of existing hotspot objects. The export data may include attributes of the hotspots such as its relative position to the panorama view (e.g., coordinates), size of the hotspot, associated text, url links. Other types of attributes may also useful. The dialog box 630 may also include buttons 635 and 637 to enable selection to copy to clipboard or to close the dialog box. The hotspot exporter 230 facilitates easy retrieval and exportation of the data of the hotspot objects to other data sources. Such data sources may include, for example, third party libraries in the web. Other types of data sources may also be useful. After the dialog box is closed, at 430, the process 400 may then return to runtime.

The following is an example of a JavaScript code for a hotspot object in the export data:

```
{
    pan: 28,
    tilt: -8,
    width: 5,
    height: 7,
    text: "T-shirts",
    url: "javascript:popupIt(e, 0, 80, -1, null, 'animation:popin-
    bounce 2s ;-moz-animation:popin-bounce 2s;-webkit-
    animation:popin-bounce 2s;')",
    target: "_self",
    img: "images/box.png"
}
```

Figure 7:
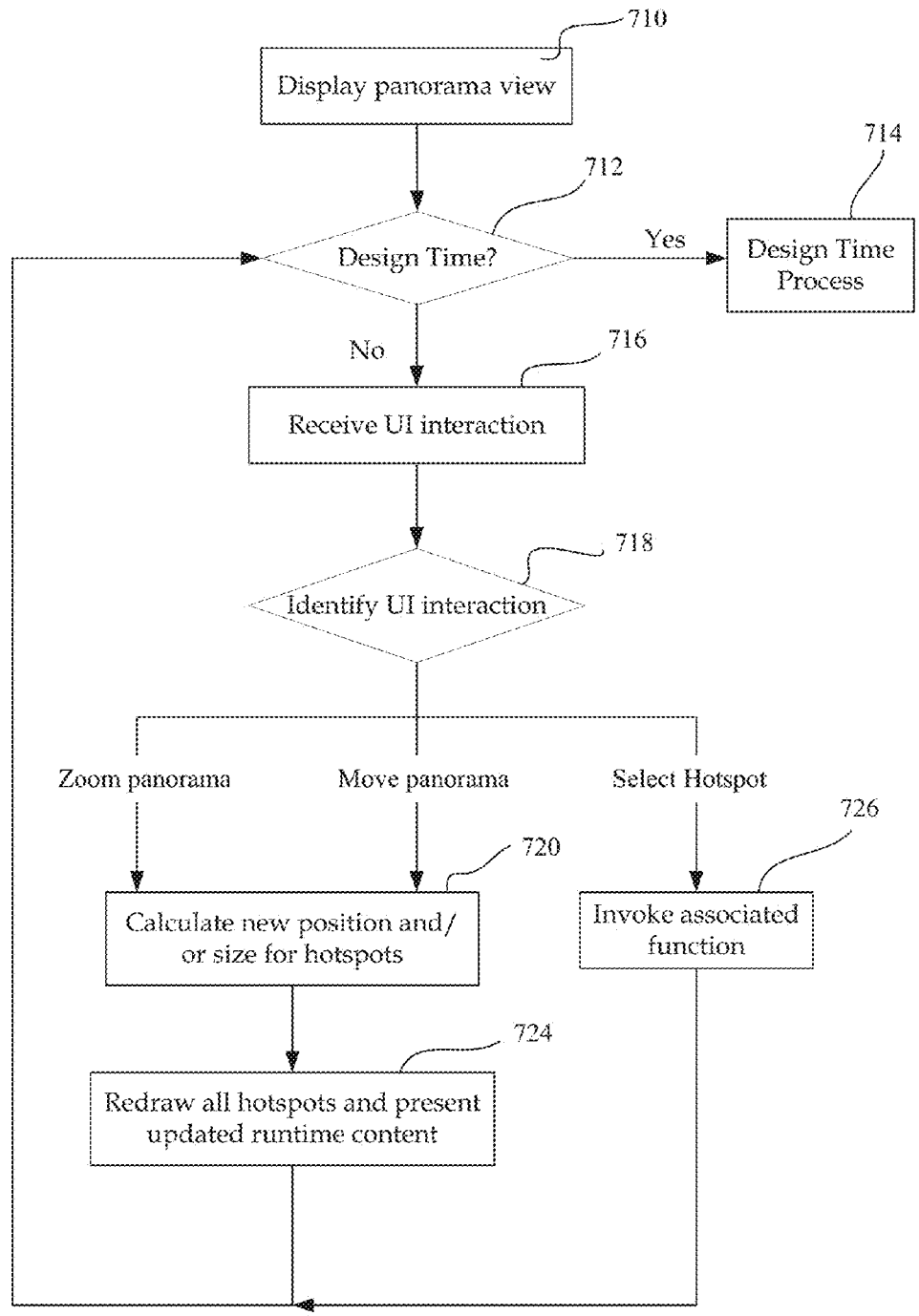
FIG. 7 shows an exemplary process for rendering hotspot objects with runtime content in a UI.

FIG. 7 shows an exemplary process 700 for rendering hotspots with runtime content in a UI. The process 700, for instance, may be used to render hotspots in a UI during design time as well as runtime. The process 700 may be implemented by the hotspot manager 120, as previously described with reference to FIGS. 1-2. It should be noted that in the following discussion, reference will be made, using like numerals, to the features described in FIGS. 1-2.

At 710, render engine 222 displays, for example, a panorama view in a user interface at a client device. The render engine 222, in one implementation, loads a panorama image from a data source such as a database of the client device or a third party web site. Other types of UI view may also be useful. In some implementations, render engine 222 may automatically render one or more hotspots associated to the panorama view in the UI. The render engine 222, for example, loads the hotspot information from a data source such as a database of the client device or a third party web site. In other implementations, the panorama view may not have any existing associated hotspots.

At 712, render engine 222 may determine if a design time process is selected. If a design time process is selected, at 714, the process 700 proceeds to a design time process. For example, design time process as described with reference to FIG. 4 may be invoked to perform design-time actions. A design time process may be selected, for instance, by a login protocol. For example, a user with authorization may perform a login protocol to enter into the design time process. Other methods for entering into the design time process may also be useful. For example, a user may be presented with a button icon in the display for entering into the design time process. In response to selection of the button, the user may be prompted to input user identification.

If a design time process is not selected, the process 700 proceeds with performing runtime actions. At 716, render engine 222 may receive UI interaction. The UI interaction, in one implementation, may be a user input to navigate the panorama view to enable display of a particular portion of the panorama view. The render engine 222 may further acquire updated UI content based on the received UI interaction and display the updated content. For example, display of a particular portion of the panorama view correspondingly displays hotspots associated to locations in that portion of the panorama view. The user input may include, but are not limited to, panning the panorama view, zooming in or out of the panorama view, etc. Such runtime actions may be performed during design time as well as runtime. In some implementations, particularly during runtime, the UI interaction may also include a user selection of an existing hotspot object to invoke one or more functions of the hotspot object. For example, a user may click on hotspot element to effect its associated function such as display of pop-up box with informational text or navigation to an associated web page via a URL link.

At 718, the render engine 222 may identify the UI interaction. If the UI interaction is identified to be a user input that moves the panorama view such as a panning movement to view a portion of the panorama view, at 720, positioning engine 224 may recalculate position of the hotspot objects based on the portion of the panoramic view that is rendered on the 2D display. As described, each hotspot object includes position information. The position information may be relative to a location of the panorama view. In response to the panorama view being moved to display a particular portion in the 2D display, the position information for all hotspots may be recalculated to enable display of an updated runtime content of the UI. That is, the position information for all hotspots may be recalculated to enable display of one or more hotspots objects that are associated to locations in that particular portion of the panorama view on the 2D display. The positioning engine 224 may further send the recalculated position information of all the hotspot objects to the render engine 222. At 724, the render engine 222 may redraw all the hotspots based on the recalculated position information and present updated runtime content on the 2D display of the client device. The process may then return to step 712 to repeat the steps of rendering runtime content of hotspot objects in the panorama view.

In another example, if the UI interaction is identified to be an action that zooms in on a location in the panorama view, at 720, positioning engine 224 may recalculate the size and/or position of the hotspots that is associated to the enlarged portion of that location in the panoramic image. For example, a hotspot object may have position coordinates (x, y) of (1, 1) and corresponding panorama view size (width, height) of (10, 10). In response to the action of zooming in on a location in the panorama view such that the (width, height) is (20, 20), the hotspot object coordinates may be recalculated to be (2, 2). The positioning engine 224 may further send the new position and size of the hotspot to the render engine 222. At 724, the render engine 222 may redraw all the hotspots based on the new size and/or position and present updated runtime content on the 2D display of the client device. For instance, the enlarged portion of the panorama view of the location may be presented with one or more hotspot objects associated to that portion of the panorama view that is being displayed. The process may then return to step 712 to repeat the steps of rendering runtime content of hotspot objects in the panorama view.

In yet another example, if the UI interaction is identified to be a user input that selects a hotspot object such as by clicking on the hotspot icon, at 726, the render engine 222 may invoke the function associated to that hotspot object. For example, the user may be directed to a different web page via a URL link assigned to that hotspot. In other examples, a pop-up box may be displayed to provide information related to a location in the panorama view with which the hotspot object is associated to. The process may then return to step 712 to repeat the steps of rendering runtime content of hotspot objects in the panorama view.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of modifying hotspot objects in a user interface (UI), comprising:
   providing, via a computer system comprising a hotspot manager, a user interface (UI);
   presenting, by the hotspot manager, a view of the user interface associated with one or more hotspots on a display, wherein the hotspot manager presents the user interface using a multiple layer UI model, the multiple layer UI model includes overlapping layers, comprising
   a first layer that displays the view of the user interface,
   a second layer displaying one or more hotspot objects, wherein the second layer displays a hotspot object with its runtime behaviour, a hotspot object comprises hotspot information which specifies its position relative to the first layer, and
   a third layer which enables an edit mode during design time of the hotspot objects, the third layer displays design-time indicators in the edit mode, wherein the design-time indicators receive and respond to design-time actions of the hotspot objects;
   wherein in the edit mode during design time,
   displaying in the user interface the design-time indicators by the third layer and the one or more hotspot objects with runtime behaviour by the second layer, wherein the one or more hotspot objects overlap one or more corresponding locations in the first layer of the user interface;
   receiving a first design-time action to modify a hotspot object from a user by a first design-time indicator in the third layer; and
   displaying in the user interface the hotspot object with its runtime behaviour in the edit mode by the second layer as the hotspot object is simultaneously being modified using the first design-time indicator in the third layer of the multiple layer UI model.

2. The method of claim 1 wherein modifying the hotspot object comprises adding a new hotspot object corresponding to a location in the first layer.

3. The method of claim 1 wherein the runtime behaviour of the hotspot object comprises a graphical icon of the hotspot object, runtime interactions or a combination thereof.

4. The method of claim 1 wherein the third layer overlays the first and second layers.

5. The method of claim 1 wherein
   the view of the UI on the first layer comprises a panorama image loaded from a web page; and
   presenting the view comprises displaying a portion of the panorama view.

6. The method of claim 5 further comprising enlarging a location in the panorama view and recalculating the position and size of the one or more hotspot objects relative to the panorama view for displaying enlarged hotspots associated to the enlarged location of the panorama view.

7. The method of claim 5 further comprising
receiving a panning movement of the panorama view for navigating to another location in the panorama view; and
recalculating the relative position of the one or more hotspot objects and presenting at least one hotspot object that is associated to the other location in the panorama view on the display.

8. The method of claim 1 wherein the first layer is a panorama layer, the second layer is a hotspot layer and the third layer is a design layer.

9. The method of claim 1 wherein:
the first design-time indicator comprises a selection box overlapping a graphical icon of the hotspot object to be modified on the second layer, and
the first design-time action comprises resizing the hotspot object relative to a corresponding location in the first layer by a drag and drop action of the graphical icon of the hotspot object.

10. The method of claim 1 wherein:
the first design-time indicator comprises a selection box on the third layer overlapping a graphical icon of the hotspot object to be modified on the second layer, and
the first design-time action comprises repositioning the hotspot object relative to another location of the first layer via a drag and drop action of the graphical icon of the hotspot object.

11. The method of claim 1 wherein the design-time indicators in the third layer comprises a button to open a hotspot dialog box, and further comprising presenting a hotspot dialog box upon receiving a user selection by the button, wherein the hotspot dialog box comprises fields for receiving attributes of the hotspot object being modified.

12. The method of claim 11 further comprising automatically generating a JavaScript code of the modified hotspot object upon confirmation of the modification.

13. The method of claim 1 wherein the design-time indicators in the third layer comprises a button which exports information of existing hotspot objects upon selection by the user, wherein the information is exported in a JavaScript array.

14. A non-transitory computer-readable medium having stored thereon program code, the program code executable by a computer to:
present a view of a user interface (UI) associated with one or more hotspots on a display using a multiple layer UI model, the multiple layer UI model includes overlapping layers, comprising
a first layer that displays the view of the user interface,
a second layer displaying one or more hotspot objects, wherein the second layer displays a hotspot object with its runtime behaviour, a hotspot object comprises hotspot information which specifies its position relative to the first layer, and
a third layer which enables an edit mode during design time of the hotspot objects, the third layer displays design-time indicators in the edit mode, wherein the third layer receives and responds to design-time actions of hotspot objects in the edit mode;
wherein in the edit mode during design time,
display in the user interface the design-time indicators by the third layer and the one or more hotspot objects with runtime behaviour by the second layer, wherein the one or more hotspot objects overlap one or more corresponding locations in the first layer of the user interface;
receive a first design-time action to modify a hotspot object from a user by the third layer; and
display in the user interface the hotspot object with its runtime behaviour in the edit mode by the second layer as the hotspot object is simultaneously being modified using the first design-time indicator in the third layer of the multiple layer UI model.

15. The non-transitory computer-readable medium of claim 14 wherein the design-time indicators in the third layer comprises a button which exports information of existing hotspot objects upon selection by the user, wherein the information is exported in a JavaScript array.

16. The non-transitory computer-readable medium of claim 14 wherein:
the view on the first layer comprises a panorama view; and
a portion of the panorama view is presented on the display.

17. The non-transitory computer-readable medium of claim 16 wherein the program code is further executable by the computer to:
recalculate the position and size of the one or more hotspot objects relative to the panorama view in response to a panning movement or a zooming movement.

18. A system comprising:
a non-transitory memory device for storing computer readable program code; and
a processor in communication with the memory device, the processor being operative with the computer readable program code to
present a view of a user interface (UI) associated with one or more hotspots on a display using a multiple layer UI model, the multiple layer UI model includes overlapping layers, comprising
a first layer that displays the view of the user interface,
a second layer displaying one or more hotspot objects, wherein the second layer displays a hotspot object with its runtime behaviour, a hotspot object comprises hotspot information which specifies its position relative to the first layer, and
a third layer which enables an edit mode during design time of the hotspot objects, the third layer displays design-time indicators in the edit mode, wherein the third layer receives and responds to design-time actions of hotspot objects in the edit mode;
wherein in the edit mode during design time,
display in the user interface the design-time indicators by the third layer and the one or more hotspot objects with runtime behaviour by the second layer, wherein the one or more hotspot objects overlap one or more corresponding locations in the first layer of the user interface;
receive a first design-time action to modify a hotspot object from a user by the third layer; and
display in the user interface the hotspot object with its runtime behaviour in the edit mode by the second layer as the hotspot object is simultaneously being modified using the first design-time indicator in the third layer of the multiple layer UI model.

19. The system of claim 18 wherein
the view on the first layer comprises a panorama view in the UI.

20. The system of claim 18 wherein the design-time indicators in the third layer comprises a button which presents a hotspot dialog box upon receiving a user selection by the button, wherein the hotspot dialog box comprises fields for receiving attributes of the hotspot object being modified.

\* \* \* \* \*